United States Patent [19]

Chang

[11] 4,029,825

[45] June 14, 1977

[54] PRODUCTION OF EGG WHITE SUBSTITUTE FROM WHEY

[75] Inventor: Pei K. Chang, Montrose, N.Y.

[73] Assignee: Stauffer Chemical Company, Westport, Conn.

[22] Filed: May 30, 1975

[21] Appl. No.: 582,550

[52] U.S. Cl. .............................. 426/271; 426/583; 426/656; 426/657

[51] Int. Cl.$^2$ ......................................... A23C 21/00

[58] Field of Search .......... 426/554, 583, 656, 271, 426/657, 490, 491, 495

[56] References Cited

UNITED STATES PATENTS

| | | | |
|---|---|---|---|
| 2,129,222 | 9/1938 | Leviton | 426/583 X |
| 2,695,235 | 11/1954 | Goede | 426/583 |
| 2,765,232 | 10/1956 | Rodgers et al. | 426/583 |
| 3,061,442 | 10/1962 | Ward et al. | 426/583 |
| 3,487,064 | 12/1969 | Swanson et al. | 426/583 X |
| 3,637,643 | 1/1972 | Wingerd | 426/583 X |
| 3,792,175 | 2/1974 | Schmitt | 426/656 |
| 3,842,062 | 10/1974 | Eastman | 426/656 X |

OTHER PUBLICATIONS

A. K. Smith et al., "Recovery of Soybean Whey Protein with Edible Gums & Detergents" Agr. & Food Chem. vol. 10, pp. 302–304.

*Primary Examiner*—Raymond N. Jones
*Assistant Examiner*—R. A. Yoncoskie
*Attorney, Agent, or Firm*—Richard P. Fennelly

[57] ABSTRACT

Egg white substitutes can be prepared from cheese or vegetable whey by first reacting it with sodium lauryl sulfate to form a complex which precipitates in acidic medium, and, after removal of most of the sodium lauryl sulfate, using the product as a replacer for natural egg white in food preparations.

10 Claims, No Drawings

PRODUCTION OF EGG WHITE SUBSTITUTE FROM WHEY

TECHNICAL DESCRIPTION OF THE INVENTION

Egg white or egg albumen has unique foaming and heat setting properties which are required in the preparation of a number of products including egg meringue. Recently, the price of dried egg albumen solids has increased substantially, and a need has therefore arisen for a low cost substitute.

A number of prior approaches to forming such a substitute are described in the patent literature. It was proposed, for example, in U.S. Pat. No. 2,695,235 to de Goede that cheese whey be adjusted to a pH of above about 9 followed by filtration to obtain a filtrate having egg white functionality. More recently, it was proposed in U.S. Pat. No. 3,706,575 to Broadhead that long chain polyphosphates be reacted with liquid whey followed by drying the resulting precipitate at a temperature of below about 180° F. Although the latter process produces an egg white substitute which can be used in a number of end uses, the product produced thereby does not have the foaming and heat setting properties needed when the substitute is to be used, for example, in an egg meringue.

It has now been found that reaction of sodium lauryl sulfate with liquid cheese whey or vegetable whey, e.g., soy whey, produces a whey-sodium lauryl sulfate complex which, when the sodium lauryl sulfate content is reduced to below about 1.0% by weight, gives a product having unique foam and heat setting properties that allow for its use in egg meringues, as well as in other applications where egg white is traditionally used. Use of other detergents to precipitate whey proteins does not yield a product having acceptable utility as an egg white substitute.

The liquid cheese whey which can be used as a starting material can be either a sweet or acid whey. Examples of suitable cheese wheys include cheddar, cottage, cream, Swiss, ricotta and mozzarella wheys. Also intended to be included within the term "liquid cheese whey" as used herein are a number of whey protein concentrates. Such concentrates can be made by a number of processes including: an electrodialysis procedure (e.g., as described by Stribley, R. C., Food Processing, Vol. 24, No. 1, p. 49, 1963); by reverse osmosis; by ultrafiltration (e.g., as described by Horton, B. S. et al., Food Technol., Vol. 26, p. 30, 1972); by alcohol precipitation (e.g., Morr et al. J. Dairy Sci., Vol. 53, p. 1162, 1970); or by gel filtration. When the latter procedure is followed the starting material for use with the present invention can be the partially delactosed, demineralized product resulting from treatment of cheese whey with a divalent metal ion and adjustment of the pH to a value above 6 at a temperature below 140° F. in accordance with the teachings of U.S. Pat. No. 3,560,219 to Attebery followed by a concentration step to crystalize lactose. This partially delactosed liquor can be used as a starting material for the present invention. Alternatively, it can be passed through the bed of a molecular sieve resin in accordance with U.S. Pat. No. Re. 27,806 to Dienst et al. to yield two fractions which can be used as starting materials for the present invention. The first comprises mainly protein with residual lactose and minerals and is available commercially under the name ENRPRO from Stauffer Chemical Company, Food Ingredients Division, Westport, Connecticut. It comprises 40–80% by weight protein (N × 6.38), 10–30% lactose, 3–15% ash, 0.5–4% fat, 0.7–3.3% lactate and 0.6–1.7% citrate. The second fraction contains mainly lactose and minerals with residual protein. It is available as ENR-EX from Stauffer Chemical Company, Food Ingredients Division, Westport, Connecticut. It comprises 40–50% lactose, 25–35% minerals, 15–20% protein (N × 6.38), 7–10% lactic acid, 3–6% citric acid, less than 1% fat, and less than 5% moisture.

The greater the amount of fat in the whey starting material, the poorer is the performance of the end product of this invention as an egg white substitute in meringues. Although fat reduction can be accomplished during the process by repeated washings and centrifugation, it is preferred to start with a low fat whey. If natural unmodified cheese wheys are to be used, acid wheys, such as cottage cheese whey, are preferred since they contain the least amount of fat.

A number of methods are useful in recovering the cheese whey protein from the cheese whey.

If desired, the liquid whey can be reacted with a solution of sodium lauryl sulfate. The weight of sodium lauryl sulfate should be from about 0.10 to 0.5%, by weight, preferably 0.20–0.40%, based on the volume of liquid whey. The temperature can range anywhere from about 10° to 45° C. and the pH can be from about 3 to about 5.

If the sodium lauryl sulfate is added in undissolved or powder form, precipitation of a sodium lauryl sulfate-cheese whey protein complex is effected if the temperature is kept between about 25° and 45° C. with the pH from about 3 to about 5.

Should it be desired to keep the temperature below 25° C. e.g., about 10°–25° C., using undissolved sodium lauryl sulfate, it is still possible to effect precipitation if the above described amounts of sodium lauryl sulfate and whey are combined at a pH of about 6.0 to 8.0, and the pH is thereafter adjusted downwardly to below about 5.0, preferably about 2.0 to 4.5. This latter process is described in greater detail in my copending U.S. patent application Ser. No. 582,488 filed on even date herewith, which is entitled "Removal of Proteins from Liquid Acid Cheese Whey".

If desired, liquid vegetable whey may also be used as a starting material. A preferred vegetable whey is soy whey and the invention will be described in terms of using such a whey. Other wheys which can be used include cottonseed, sesame seed, rapeseed, sunflower seed, mung bean, Great Northern bean and coconut wheys. A process for removal of the protein content as a sodium lauryl sulfate modified whey protein is described by Smith et al. in Agricultural and Food Chemistry, Vol. 10, pp. 302–304, which is incorporated herein by reference. Preferably, sodium lauryl sulfate in an effective amount for precipitation of the vegetable proteins is added to the liquid vegetable whey. Generally a weight ratio of about 0.30 to about 0.60, preferably about 0.50, of sodium lauryl sulfate based upon the weight of the protein in the liquid whey is added at a pH of below about 5.0, preferably about 3.5, in order to achieve an optimum, e.g., greater than 95%, by weight, precipitation of the protein. The whey should be at a temperature of from about 20° to 40° C., preferably from about 30° to about 35° C., when the sodium lauryl sulfate is added to the whey.

Mixtures of any of the foregoing cheese and vegetable wheys can be used as starting materials.

Removal from the solution of the cheese or vegetable whey protein-sodium lauryl sulfate complex, after it has been precipitated by any of the methods mentioned above, is easily accomplished either by centrifugation, by settling and siphoning or by decantation. Centrifugation at about 740 to 1150 G for about 30 minutes is usually effective. The complex should be washed at least once with distilled water in a volume ratio of from about 1:1 to about 1:5. The second or later wash steps aid in reducing the fat content of the complex which improves its performance as an egg white substitute in egg meringues. The pH of the wash solution should be acidic, e.g., have a pH of about 2.0 to 4.0, to avoid resolubilization of the complex.

Governmental regulations mandate that the sodium lauryl sulfate must not exceed a certain level, i.e., 0.1% by weight, in dried egg albumen. Hence, it is necessary to remove a major portion of the sodium lauryl sulfate from the cheese or vegetable protein/SLS complex. Various methods can be used to cause such removal including: precipitation of the sodium lauryl sulfate, e.g., with barium chloride as described in J. Amer. Chem. Soc. 66:692 (1944); dialysis, as described in J. Amer. Chem. Soc. 81:1400 (1959); reaction with acetone, as described in Ind. Eng. Chem. 36:372 (1944); or by use of an appropriate ion exchange resin as described in J. Biological Chem. 246:4504 (1971). A preferred way of removing the sodium lauryl sulfate is to utilize an ion exchange resin, preferably one that is in the hydroxy form. One preferred resin which can be used is Duolite A-102D resin. The pH during elution should be greater than about 9.5. If desired, two ion exchange resins can be used with the first in the hydroxy form and the second in the chloride form. A sample at an initial pH of 5.5–7.0 will elute from the first column at a pH of 11.7 and will contain below 0.1% sodium lauryl sulfate. It can then be added to the second column to lower the pH to about 9.5 to 10.0. If soy whey is used as a starting material it is advantageous to hold the eluted sample at a pH of about 11 to about 12 at room temperature for about 1 hour followed by holding it at the same pH at a temperature of from about 0° to 5° C. for about 12 to 24 hours.

The material obtained from the resin, which is a sodium lauryl sulfate modified whey protein, can be freeze or spray dried to form a product suitable for use as an egg white substitute. Typical conditions for such spray drying call for use of a Bowen 2 fluid nozzle spray drier (at 100 psig) with a feed temperature of about 50°–60° F., a feed rate of about 60 ml/min., an inlet air temperature of about 410° F., and an outlet air temperature of about 160° F.

When the whey product formed as described above is to be used as an egg white substitute, it is beneficial to add from about 0.1 to about 5% by weight, preferably about 2.5 to about 3.5%, of a divalent metal cation containing compound based on the weight of the egg white substitute, i.e., the total weight of complex and compound containing the cation, to improve the heat sensitivity of the egg white substitute. Examples of such cations are: calcium, the preferred cation, magnesium, and aluminum.

The egg white substitute can then be mixed with sugar and water in an amount ranging from about 1 to about 5% by weight of the entire formulation which will be used in the preparation. The present invention is further illustrated by the following Examples:

EXAMPLE 1

A modified cheese whey formed by treating a partially delactosed whey mother liquor through the bed of a molecular sieve resin according to U.S. Pat. No. Re. 27,806 and separating the first fraction therefrom was reacted with sodium lauryl sulfate. The whey product has the following typical composition: Protein 75–80% by weight; Lactose 10–26%; Ash 3–11%; Fat 2%, maximum; Lactate 0.7–3.3%; and Citrate 0.6–1.7%. About 0.24 grams of sodium lauryl sulfate was added to 100 ml. of liquid modified whey (1% dispersion, pH 6.5), and the pH was adjusted to 4.0 with 1N hydrochloric acid. The mixture was filtered, and the precipitate was recovered and washed twice with between 1 and 5 volume measures of distilled water to the volume of the precipitate. The washed product was centrifuged at 2,000 to 4,000 rpm and its pH was adjusted to 6.5 with 1N sodium hydroxide. It was then freeze dried. The resulting whey-sodium lauryl sulfate product had a protein content of about 60% and a sodium lauryl sulfate content of 20–30%. This material would not act as an egg white substitute and cannot be added to food unless the sodium lauryl sulfate is substantially removed.

The whey protein-sodium lauryl sulfate complex was then diluted to a solids content of about 10%, and 400 ml. of this solution was added to an ion exchange column (2 inches dia. × 20 inches length) which was packed with 1 liter of Duolite A-102 D resin. This resin had been pretreated with 2000 ml. of a 4% by weight solution of NaOH and then with 2000 ml. of a 2% by weight solution of NaCl. The resin was washed with water to a pH of 8–9 prior to and after the addition of NaCl. The flow rate through the resin was 10 ml./min. The eluant, with a pH of 10.5 to 11.0 and a low sodium lauryl sulfate content, i.e., less than 0.1% on a solids basis, was freeze dried.

A number of formulations were prepared to test the suitability of the sodium lauryl sulfate modified whey product as an egg white substitute. Monocalcium phosphate (anhydrous) was added to the complex as a source of divalent cations to render it heat sensitive. Table 1 sets forth the amounts, in grams, of ingredients in control batches 1–3, and the batches using the sodium lauryl sulfate modified whey product as a replacer for egg white (batches 4–5):

TABLE 1

| Ingredient | Batch | | | | |
|---|---|---|---|---|---|
| | 1 | 2 | 3 | 4 | 5 |
| Dry Egg Albumen* | 15 | 7.5 | 7.5 | — | 7.5 |
| Monocalcium phosphate (anhydrous) | 0.52 | 0.52 | 0.52 | 0.52 | 0.52 |
| Untreated Modified Whey Product** | — | 7.5 | — | — | — |
| SLS Modified Whey Product | — | — | — | 7.5 | 7.5 |
| Sugar | 297 | 297 | 289.5 | 289.5 | 297 |
| Water | 135 | 135 | 135 | 135 | 135 |

*Henningsen egg white, type P-11.
**As described above.

The albumen, monocalcium phosphate (anhydrous) and water in the above amounts were dissolved in the small bowl of a Hamilton Beach mixer. Sugar was slowly added for 2 minutes while beating the mixture at high speed. The total mixing time was about 6 minutes. All mixtures were then baked at about 275° F. for 30 minutes inside a household electric oven and were then evaluated. Table 1A sets forth the evaluation for the meringue from each sample:

TABLE 1A

| Sample | Evaluation |
|---|---|
| 1 | Hard meringue with firm peaks and no evidence of collapsing |
| 2 | The sample collapsed after being in the oven for two minutes. The final product was completely flat and hard, similar to a disk. The specific gravity of the foam was 0.80. |
| 3 | The sample formed a hard meringue which was slightly flatter than the meringue from No. 1. The specific gravity of the foam was 0.41. |
| 4 | The sample formed a hard meringue which collapsed slightly upon cooling. The specific gravity of the foam was 0.44. |
| 5 | The sample formed a meringue very similar to the meringue from No. 1 |

These data demonstrate that the present invention, as demonstrated in samples 4 and 5 above, produces a meringue having acceptable properties. The modified whey product without reaction with sodium lauryl sulfate, as shown in sample 2 above, does not possess acceptable whippability and heat coagulability.

EXAMPLE 2

Two thousand grams of a modified whey product formed by treating partially delactosed whey mother liquor through a molecular sieve resin according to U.S. Pat. No. Re. 27,806 and separating the first fraction therefrom was reacted with sodium lauryl sulfate. The product had the following typical analysis:

| | |
|---|---|
| Protein | 53.6% |
| Lactose | 26.5% |
| Ash | 10.2% |
| Fat | 2.5% |
| Moisture | 2.7% |
| Lactate | 2.1% |
| Citrate | 2.4% |

It is available commercially as ENRPRO 50 from Stauffer Chemical Company, Food Ingredients Division, Westport, Conn. The amount of whey described above was dispersed in about 14 liters of water with a mechanical stirrer and 350 g. of sodium lauryl sulfate was added. The pH was adjusted to 3.5 with about 400 ml. of 4N hydrochloric acid. This mixture was stored under refrigeration for about 18 hours, the supernatent was decanted, and the caked precipitate was washed twice with water in a 1:5 volume ratio. The precipitate was allowed to stand for about eighteen hours under refrigeration between each wash to allow for complete settling. The water was separated from the precipitate by decantation.

A portion of the whey protein-sodium lauryl sulfate complex was diluted to about 10% solids content, had its pH adjusted to 5.5 and was passed through an ion-exchange column (4 inches dia. × 48 inches length) which was packed with a 9 liter volume of Duolite A 102 D resin in the hydroxy form at an elution rate of about 80 ml/min.

The first 4 liters were pooled, the pH was adjusted to 7.0, and it was freeze dried, was ground to pass through 60 mesh and was analyzed. The other portion of the sodium lauryl sulfate treated whey product was treated similarly and was also collected. The washings from the column were combined with this latter portion. The analysis of these fractions, called Samples A and B, respectively, and of ENRPRO 50 is given below.

| Component | ENRPRO 50 | SLS Modified Whey Product | |
|---|---|---|---|
| | | A | B |
| | (%) | (%) | (%) |
| Protein (N × 6.38) | 53.6 | 72.4 | 74.6 |
| Ash | 10.2 | 5.9 | 5.7 |
| Moisture | 2.7 | 2.0 | 5.2 |
| Fat | 2.5 | 3.3 | 3.0 |
| Lactose | 26.5 | 16.4* | 11.5* |

*by difference.

It was found that both fractions at a 50% level of replacement of dried egg albumen produced a meringue which was comparable to that produced with use of 100% dry egg albumen.

EXAMPLE 3

This Example shows the use of the product of this invention in forming a divinity candy.

The following steps were used:

1. Two batches of Sucrose (497 g.), corn syrup (217 g.), salt (1.5 g.) and water (112 ml.) were heated without stirring to 265° F.;
2. Egg albumen solids (8.4 g.) sold by Henningsen Foods (type P-20) and a 50:50 mixture of the egg albumen solids (4.2 g.) and the sodium lauryl sulfate modified whey product (4.2 g.) of Example 2 (Sample A) were each added to separate mixtures of monocalcium phosphate, anhydrous (0.29 g.) in 59.5 ml. of water and each was whipped until stiff at speed No. 10 on a Kitchen Aid mixer;
3. The hot syrup from step 1 was added to the whipped mixture of step 2 in a steady stream for the first 2 minutes in the mixer at speed No. 8 and for the next 6 minutes at speed No. 10. Vanilla extract (2.2 ml.) was then beaten into the mixture;
4. The mixture was then poured into an aluminum pan, was weighed and was allowed to cool. The specific volume and hardness was measured. The Table sets forth the results for the mixtures containing the albumen and the SLS modified whey product of Example 2:

TABLE 2

| Sample Containing | Sp. Vol. (cc./g.) | Hardness* (mm) |
|---|---|---|
| Egg albumen | 0.99 | 4.6 |
| Egg albumen/SLS modified whey product (50:50) | 1.17 | 1.6 |

*hardness was evaluated by determining the distance in mm that a penetrometer cone loaded with 20 g. penetrated into the candy in 10 seconds.

The 50:50 mixture of egg albumen and sodium lauryl sulfate modified whey product produced a candy having a higher specific volume than the use of egg albumen alone. The flavor and texture of the candy containing the SLS modified whey product were judged to be superior to the candy containing the egg albumen alone.

EXAMPLE 4

This Example shows the use of the product of this invention in an angel food cake.

A mixture of the following ingredients was made:

Mixture A

| Ingredient | Amount (g.) |
| --- | --- |
| Egg white solids | 42.5 |
| Granulated sugar | 80.0 |
| Monocalcium phosphate, anhydrous | 1.2 |
| Salt | 2.0 |
| Water | 296.0 |

The above solid ingredients were blended dry and were added to the water at 70°–75° F. in a mixing bowl. A speed of 1 on a Hobart C-100 mixer was used, and the mixture was beaten for about 1 minute. It was then beaten at speed No. 2 for an additional minute to insure thorough wetting of the ingredients. The mixer speed was then moved to No. 3 and mixing was continued until the meringue formed stiff peaks, e.g., in 1–2 minutes.

A second mix of ingredients was also prepared:

Mixture B

| Ingredient | Amount (g.) |
| --- | --- |
| Granulated sugar | 248.0 |
| Wheat starch (Starbake, non-gelatinized starch) | 16.3 |
| Monocalcium phosphate, anhydrous | 5.0 |
| Baking soda | 1.45 |
| Cake flour (Sno - sheen) | 90.0 |

Mixture B, whose ingredients had been previously mixed and sifted three times, was then folded into the meringue in approximately four equal portions. The resulting mixture was baked in a 10 inch angel food cake pan for 60 minutes at 360° F. The Table set forth below describes the properties of the above cake and one having 5% of the egg white removed and another with 5% of the egg white removed and replaced by the product of this invention, e.g., Sample A from Example 2.

TABLE 3

| Sample | % Albumen Replaced | Whip Time** (Sec.) | Specific Gravity (g/cc.) | | Cake Sp. Vol. (cc./g) |
| --- | --- | --- | --- | --- | --- |
| | | | Foam | Batter | |
| Albumen* | | | | | |
| A | None | 92 | 0.105 | 0.290 | 5.16 |
| B | 5$^f$ | 90 | 0.110 | 0.300 | 4.92 |
| SLS/Modified Whey product | 5$^a$ | 120 | 0.120 | 0.315 | 5.16 |

*Henningsen P-20 egg white
**at speed No. 3 on a Hobart C-100 mixer
$^f$5% of the egg white was removed from the formulation
$^a$5% of the removed egg white was replaced with the sodium lauryl sulfate modified whey product of Example 2 (Sample A).

The above data shows that mere reduction of the egg albumen content in an angel food formulation by 5% significantly reduces the cake volume but that replacement of the removed egg albumen with the sodium lauryl sulfate modified whey product shown in Example 2 restores the cake volume to the value obtained when the original amount of egg albumen is used.

EXAMPLE 5

This Example illustrates the use of soy whey as a starting material in forming the product of the present invention.

Twelve liters of soy whey were treated in accordance with the procedure described by Smith, A. K. et al. as described in Agricultural and Food Chemistry, Vol. 10, pp 302–304. Two thousand grams of soy flour, available commercially as Soya Fluff 200 W from Central Soya, was dispersed in about 18 liters of water with a mechanical stirrer. The pH was adjusted to 7.5 using 4N hydrochloric acid. The mixture was stored under refrigeration for about 18 hours. The supernatent soy whey was collected with the aid of centrifuging at 2000 rpm following pH adjustment to 4.5 and standing under refrigeration for 18 hours. The pH of the soy whey was further lowered to 3.5. Thirty-two grams of sodium lauryl sulfate, commercially available as Duponol C from DuPont, was dispersed in the soy whey at 25°–30° C, with the aid of a mechanical mixer. Precipitation occurred immediately. The supernatant was separated from the precipitate by centrifugation at 2000 rpm and discarded. The pH of the precipitate in slurry form which contained the whey protein-sodium lauryl sulfate complex, was adjusted to 6.0 using 1N hydrochloric acid to redisperse the complex. The solid content was determined to be 20%.

The whey protein-sodium lauryl sulfate complex dispersion was diluted to a solids content of about 10% and was then passed through an ion exchange column (2 inches diameter × 20 inches length) which was packed with 1 liter of Duolite A-102-D resin in hydroxy form at an elution rate of about 10 ml/min.

The eluted protein solution having a pH of 11.7 was stored under refrigeration for 16 hours, the pH was adjusted to 7.0, and the solution was freeze dried. It contained 91.7% protein and 0.1% sodium lauryl sulfate.

Formation of a Hard Egg Meringue

Fifteen grams of either egg albumen or the sodium lauryl sulfate modified soy whey product described above, 0.52 g. of monocalcium phosphate (anhydrous) and 135 ml. of water were dissolved in a beaker for 15 min. and were then added to a 3 qt. mixing bowl of a Hobart (C-100) mixer. This mixture was whipped at Speed No. 3 for 2 minutes without sugar. Sugar was then slowly added while beating (at Speed No. 3). The total mixing time was about eight minutes.

The mixture was then baked at about 275° F. inside a reel oven for 90 minutes and was then evaluated. Table 4 sets forth the evaluation of the meringue for each sample.

TABLE 4

| Sample (Protein Content) | Foam Sp. Grav.* | pH | Baked Meringue Sp. Vol.** | Evaluation |
| --- | --- | --- | --- | --- |
| Egg albumen (Henningsen P-20) (min. 80% protein) | 0.337 | 5.9 | 6.35 | Hard meringue with stiff peaks |
| SLS modified soy whey protein (91.7% protein) | 0.287 | 5.7 | 7.57 | Hard meringue with stiff peaks |

*in units of grams/cc.
**in units of cc./gram

EXAMPLE 6

This illustrates the use of the sodium lauryl sulfate-modified soy whey protein in forming an angel food cake. The soy whey-SLS complex of Example 5 was diluted to a solids content of about 10% and was then passed through an ion exchange column (2 inches diameter × 20 inches length), which was packed with 1 liter of Duolite A-102 D resin in hydroxy form. The eluted protein solution, having a pH of about 12, was applied to a second column (1½ inches diameter × 20 inches length) which was packed with 500 ml. of Duolite A-102 D resin in chloride form. The eluted protein solution had a pH of 9.5 and this pH was adjusted to 7. The solution was freeze dried. The final product contained less than 0.1% sodium lauryl sulfate.

The material so prepared produced a hard meringue which was comparable to that produced by use of dry egg albumen. This material was further tested in an angel food cake formula as illustrated in Example 4. Table 5 sets forth the evaluation for the angel food cake produced from this material.

TABLE 5

| Sample Content | % Albumen Replaced | Whip Time* (sec.) | Specific Gravity** Foam | Batter | Cake Specific Volume*** |
|---|---|---|---|---|---|
| Albumen (Henningsen P-20 egg white) | — | 92 | 0.105 | 0.29 | 5.16 |
| SLS modified soy whey protein | 5 | 90 | 0.100 | 0.315 | 5.12 |

*Speed No. 3 on a Hobart C-100 mixer
**in grams/cc.
***in cubic centimeters/gram The foregoing Examples are merely illustrative of a number of preferred embodiments of the present invention. The appended claims set forth the scope of protection sought.

What is claimed:
1. A process for forming an egg white substitute which comprises:
    a. combining liquid whey with an effective amount of sodium lauryl sulfate to form a whey protein-sodium lauryl sulfate complex which precipitates from solution; and
    b. reducing the sodium lauryl sulfate content of the complex to no higher than about 1.0% by weight.
2. A process as claimed in claim 1 wherein the whey is cheese whey.
3. A process as claimed in claim 1 wherein the whey is vegetable whey.
4. A process as claimed in claim 2 wherein the cheese whey is selected from the group consisting of acid and sweet wheys.
5. A process as claimed in claim 2 wherein the cheese whey is the first fraction from the product obtained by passing partially delactosed cheese whey mother liquor through a bed of a molecular sieve resin, said fraction comprising 40–80% by weight protein. 10–30% lactose and 3–15% ash.
6. A process as claimed in claim 2 wherein the amount of sodium lauryl sulfate added to the cheese whey ranges from about 0.10 to 0.50% by weight based on the volume of liquid cheese whey.
7. A process as claimed in claim 3 wherein the weight ratio of sodium lauryl sulfate which is added to the vegetable whey ranges from about 0.30 and 0.60 based on the weight of protein in the vegetable whey.
8. A process as claimed in claim 1 wherein the sodium lauryl sulfate content is reduced by passing the complex through an ion exchange resin in the hydroxy form.
9. A process as claimed in claim 1 which further comprises addition of about 0.1 to 5% by weight of a compound comprising a divalent metal cation to the complex containing not more than about 0.1% sodium lauryl sulfate.
10. A process as claimed in claim 9 wherein the divalent metal cation is calcium.

* * * * *